No. 685,424. Patented Oct. 29, 1901.
T. MAIN.
LUGGAGE CARRIER FOR BICYCLES.
(Application filed Mar. 18, 1901.)
(No Model.)
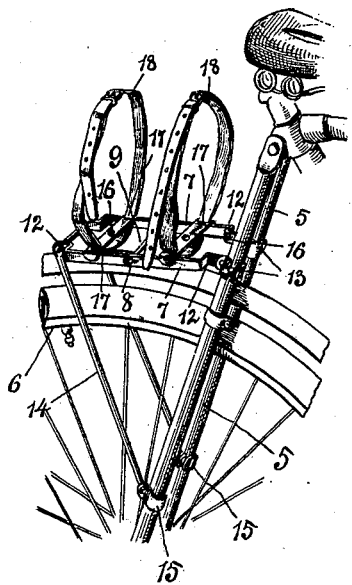
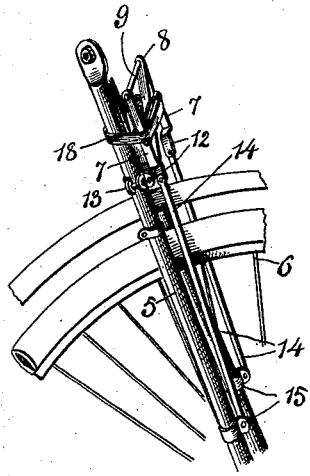
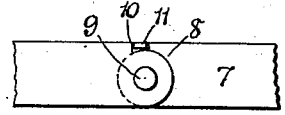
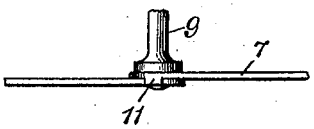
WITNESSES
INVENTOR
Thomas Main
BY
ATTORNEYS

UNITED STATES PATENT OFFICE.

THOMAS MAIN, OF LEAMINGTON, ENGLAND.

LUGGAGE-CARRIER FOR BICYCLES.

SPECIFICATION forming part of Letters Patent No. 685,424, dated October 29, 1901.

Application filed March 18, 1901. Serial No. 51,589. (No model.)

*To all whom it may concern:*

Be it known that I, THOMAS MAIN, a subject of the King of England, residing at Leamington, England, have invented certain new and useful Improvements in Luggage-Carriers for Bicycles, of which the following is a full and complete specification, such as will enable those skilled in the art to which it appertains to make and use the same.

This invention relates to luggage-carriers for bicycles and similar vehicles; and the object thereof is to provide an improved device of this class which is adapted to be connected with the frame of the vehicle and to be compactly folded together when not in use; and with this and other objects in view the invention consists in a device of the class specified constructed as hereinafter described and claimed.

The invention is fully disclosed in the following specification, of which the accompanying drawings form a part, in which the separate parts of my improvement are designated by the same reference characters in each of the views, and in which—

Figure 1 is a side view of a part of the frame of a bicycle and a part of the drive-wheel mounted therein and showing my improved luggage-carrier connected therewith; Fig. 2, a similar view showing the luggage-carrier folded as when not in use; and Figs. 3 and 4, side and plan views, respectively, of a detail of the luggage-carrier.

In the drawings forming part of this specification I have shown my improvement applied to an ordinary bicycle, and in said drawings, reference being made to Figs. 1 and 2, I have shown at 5 the upwardly-directed rods of the frame of a bicycle, between which the drive-wheel 6 is mounted, and in the practice of my invention I provide a luggage-carrier which comprises a frame composed of two side bars 7, formed in sections and pivotally connected at the middle of the frame, as shown at 8, the connection at 8 being made by a cross-rod 9, which passes through the separate members of the side bars, and this connection constitutes an ordinary hinged joint so formed that the central part of the frame will fold upwardly, but will not fold below a horizontal line, and in order to accomplish this result I form in one section of the side bar 7 a notch or recess 10 and provide the other section with a lug or projection 11, adapted to enter said notch or recess.

The ends of the side bars 7 of the frame of the luggage-carrier are bent inwardly and provided with longitudinal parallel projections, as shown at 12, and the inner end of the frame is pivotally connected, by means of said parallel projections 12, with clips 13, which are adapted to be secured in the usual manner to the rods 5 of the frame of the vehicle, and pivotally connected with the outer end of said frame or with the parallel projections 12 thereof are rods 14, which are also pivotally connected with clips 15, adapted to be secured to the rods 5 of the frame of the vehicle at a predetermined distance below the clips 13.

The frame of the luggage-carrier is also provided with transverse plates 16 at the opposite sides of the transverse center thereof and in the end portions of which are formed openings 17, through which are passed straps 18, by means of which the luggage to be carried is secured to said frame of the luggage-carrier.

When the luggage-carrier is not in use, the frame thereof is folded upwardly, as shown in Fig. 2, and this brings the rods 14 close to the rods 5 of the frame of the vehicle, and the separate parts of the luggage-carrier frame are compactly folded together and secured to the rods 5 by one of the straps 18 or by an independent strap, as shown, or by any other means, as shown in Fig. 2.

My improved luggage-carrier is simple in construction and operation and perfectly adapted to accomplish the result for which it is intended and may be connected with a bicycle of ordinary construction in the manner shown, and said luggage-carrier is also comparatively inexpensive and may be detached from the bicycle whenever desired.

When the luggage-carrier is in position, the separating-frame thereof is directly over the drive-wheel of the vehicle and rearwardly of the seat and is thus entirely out of the way and does not interfere with the operation of the vehicle in any way.

Having fully described my invention, what I claim as new, and desire to secure by Letters Patent, is—

1. A luggage-carrier for bicycles and similar vehicles comprising a frame consisting of parallel side bars composed of separate sections pivotally connected at the middle of the frame so as to allow said frame to fold upwardly, said frame being adapted at one end to be connected with the rear upright rods of the frame of the vehicle, and being provided at the opposite ends with pivoted rods which are also adapted to be connected with the said rods of the frame of the vehicle, substantially as shown and described.

2. A luggage-carrier for bicycles and similar vehicles, comprising a frame consisting of separate parts pivotally connected at the middle of the frame so as to allow said frame to fold upwardly, means for connecting one end of said frame with the upright rods of the vehicle, and other rods being connected with the opposite end of said frame and provided with devices by means of which they are pivotally connected with or hinged to the said rods on the frame of the vehicle, substantially as shown and described.

In testimony that I claim the foregoing as my invention I have signed my name, in presence of the subscribing witnesses, this 11th day of February, 1901.

THOMAS MAIN.

Witnesses:
CHARLES NOWELL,
HAROLD MARK PARRISH.